United States Patent [19]
Schneider, Jr. et al.

[11] Patent Number: 6,016,462
[45] Date of Patent: Jan. 18, 2000

[54] ANALYSIS OF STATISTICAL ATTRIBUTES FOR PARAMETER ESTIMATION

[75] Inventors: William A. Schneider, Jr.; L. Don Pham; James R. Myron, all of Houston, Tex.

[73] Assignee: Exxon Production Research Company, Houston, Tex.

[21] Appl. No.: 08/921,283

[22] Filed: Aug. 29, 1997

[51] Int. Cl.$^7$ .................................................. G06F 19/00
[52] U.S. Cl. .............................................. 702/14; 702/16
[58] Field of Search .................................... 702/114, 116, 702/117, 118; 367/124, 152, 173

[56] References Cited

U.S. PATENT DOCUMENTS

| | | | |
|---|---|---|---|
| 3,529,282 | 9/1970 | Brown et al. | 340/15.5 |
| 5,051,960 | 9/1991 | Levin | 367/24 |
| 5,515,335 | 5/1996 | Swan | 367/47 |
| 5,587,967 | 12/1996 | Ferber | 367/53 |
| 5,774,417 | 6/1998 | Corrigan et al. | 367/24 |
| 5,784,334 | 6/1998 | Sena et al. | 367/47 |
| 5,812,963 | 9/1998 | Schneider, Jr. et al. | 367/14 |
| 5,818,795 | 10/1998 | Hawkins et al. | 367/21 |
| 5,838,634 | 11/1998 | Jones et al. | 367/73 |
| 5,873,050 | 2/1999 | Schneider, Jr. et al. | 367/24 |

OTHER PUBLICATIONS

G.J.H. Schoekher, et al., "The Use of Dip and Azimuth Displays for 3D Seismic Interpretation", Developments in Geophysical Techniques related to finding The Subtle Trap, Mar. 1990, Norwegian Petroleum Society.

G.A. Partyka, et al. "Seismic Character Mapping Using Multivariate Statistical Pattern Integration", Jun. 1993, European Association of Exploration Geophysicists.

*Primary Examiner*—Christine K Oda
*Assistant Examiner*—Victor J. Taylor
*Attorney, Agent, or Firm*—Albert B. Kimball, Jr.

[57] ABSTRACT

Computer-implemented methods of processing seismic data are subjected to quantitative evaluation by a computerized testing procedure. The effect of the data processing software under evaluation on attributes of the seismic data is measured and statistically evaluated. The effect of various user-selectable processing parameters of the software under evaluation is also measured and statistically evaluated. To evaluate the software effect on attributes, an attribute of known content represented by seismic data is selected. The seismic data represented by that attribute is processed by the processing software under evaluation. A test measure of the attribute is recomputed as indicated by the results of the processing. A quantitative statistical analysis of the similarities of the two attributes is then performed. For quality control of parameter estimates, a parameter-sweep test is performed on original data containing known events. An attribute is computed for both the original data and the parameter-sweep test results. Again, quantitative statistical measures of the similarities between the attributes are formed for evaluation purposes.

20 Claims, 9 Drawing Sheets

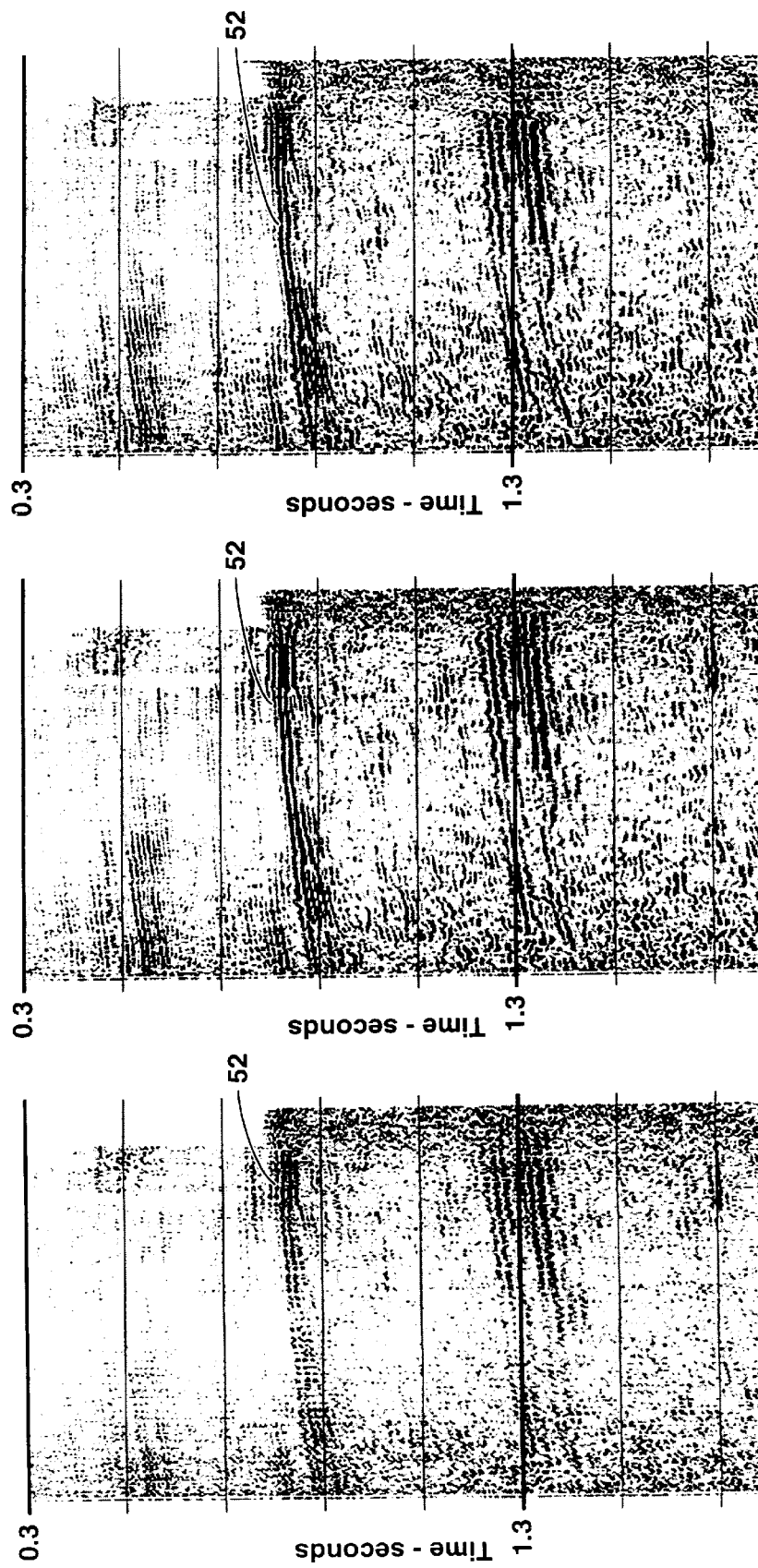

ANALYSIS OF STATISTICAL ATTRIBUTES FOR PARAMETER ESTIMATION

BACKGROUND OF THE INVENTION

1. Field of the Invention

The present invention relates to quality control of seismic data processing. Specifically, the present invention involves computerized evaluation of seismic data processing software, and more particularly evaluation of how the data processing software alters the actual content of the data being processed.

2. Description of the Prior Art

Seismic attributes play a key role in seismic data interpretation. Examples of attributes used in seismic data interpretation include amplitude, phase, central frequency, bandwidth, signal-to-noise ratio, crosscorrelation coefficient and the like. Seismic attributes also can provide useful information for seismic-processing quality control, because attributes are sensitive to relative changes that the seismic data undergo during processing. Displays of seismic attributes have been monitored to detect processing-induced changes in the data and thereby catch processing mistakes, such as poor/wrong parameter choices, and software bugs.

So far as is known, trained analysts traditionally attempted this by examining seismic data displays, before and after processing, a technique sometimes referred to as beauty contests. These visual approaches were subjective and interpretive. Real data are noisy and composed of many reflection events, and data displays rarely yielded objective interpretations. Small-to-medium scale details which would be more indicative of data processing changes might not even appear in data displays.

Further, processing parameters selected for use in processing data also could affect the content of the data. Examples of these types of parameters included time shift, deconvolution operator length, migration aperture width, velocity function and the like. Again, so far as is known, these parameters have been selected by visual, subjective comparisons of processing results using various values of a parameter in question. As has been already mentioned, real seismic data are noisy and composed of many events. Small scale details, which would more clearly illustrate ineffective or distorting parameter values, often would not show up in data plots.

SUMMARY OF THE INVENTION

Briefly, the present invention provides a new and improved method of quantitative analysis or evaluation of computerized seismic data processing. Selection of a substantially optimum value for a data processing parameter from a set or range of proposed values for that parameter is permitted. Examples of the data processing parameters include maximum time shift used for static correction; deconvolution operation length; migration aperture width; velocity function and others.

A section or window of seismic data of known content, and preferably with a strong, coherent signal is selected. An initial measure of a seismic attribute is formed for the known content seismic data. Then, the same known content seismic data is subjected to a parameter sweep test. Separate processing runs are performed on the known content seismic data for each value from the set of proposed values of that parameter. An attribute measure or value of the same attribute obtained as the initial measure is then obtained for each of the separate processing runs which were made using the different values of the processing parameter. The different attribute measures are then compared with the initial measure and an optimum value is chosen as indicated by the comparison results.

The present invention also allows for quality control of seismic data processing software by analysis of the effect of the software on attributes. An attribute of known content is obtained based on the seismic data of known content, again preferably from an area with a strong, coherent signal. The known content data is then processed by the software being evaluated, and a test value of the same attribute is obtained from the data after processing. The two values of the attribute may then be compared and statistically analyzed for their similarities. If the two attribute values differ significantly, errors or flaws are present in the software being evaluated.

BRIEF DESCRIPTION OF THE DRAWINGS

A better understanding of the present invention can be obtained when the following detailed description of the preferred embodiment is considered in conjunction with the following drawings, in which:

FIGS. 8A, 8B and 8C are plots of seismic data after processing for three different values of a maximum allowable time shift parameter during parameter-sweep tests.

DETAILED DESCRIPTION OF THE PREFERRED EMBODIMENT

1. Analysis of Statistical Attributes for Processing Quality Control

Figure 1:
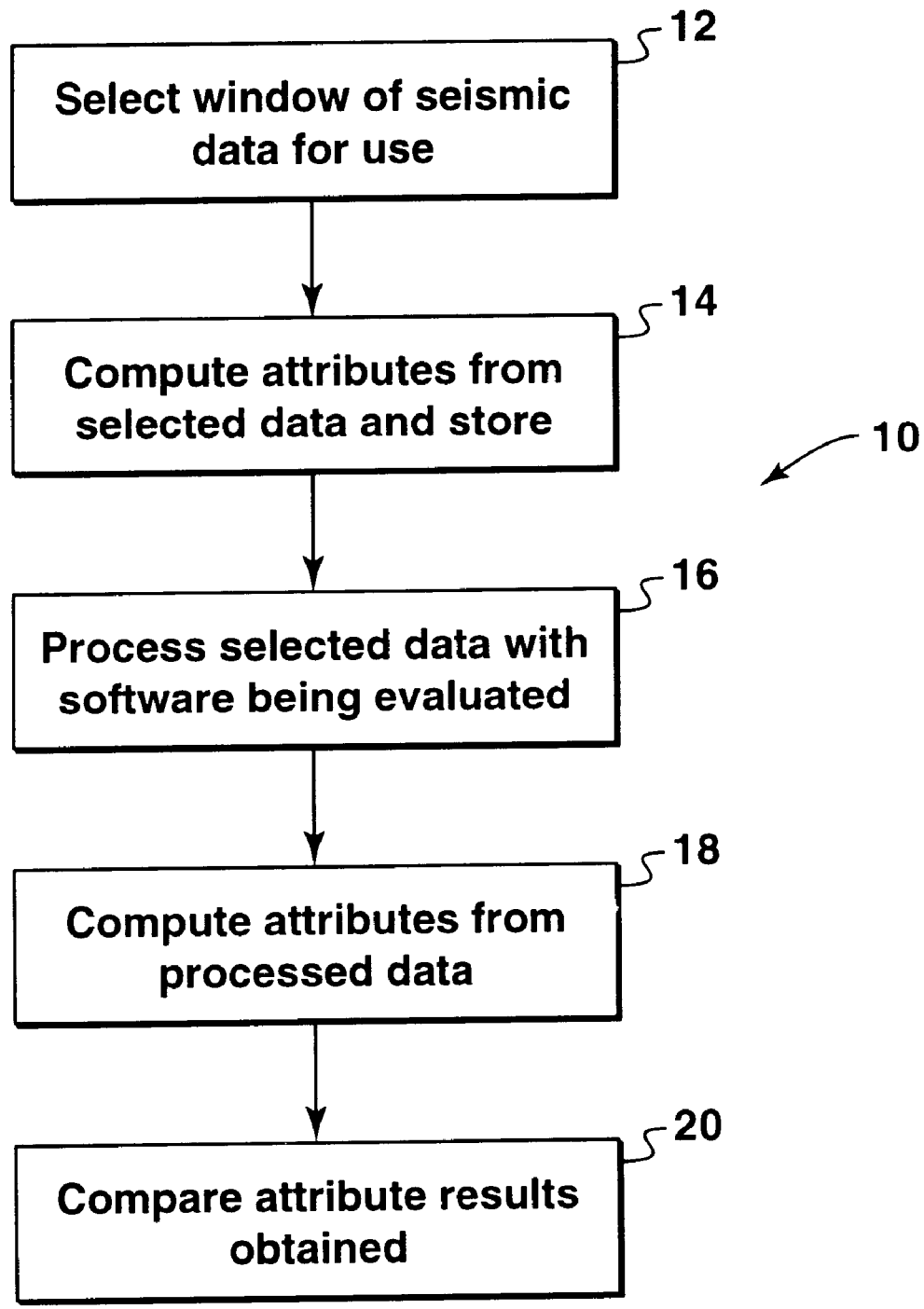
FIG. 1 is a flow chart depicting the steps of a process of quality control of seismic data processing software using seismic attributes.

In the drawings, a flow chart 10 (FIG. 1) depicts the steps performed according to the present invention for evaluation of quality control of seismic data processing software. Certain of the steps in the flow chart 10 are performed in a programmed digital computer. The computer is of suitable computational capacity in terms of both speed and data volume.

During a first step 12 of the process depicted in the flow chart 10, a window or portion of the seismic data to be used in evaluating the quality of the processing software is selected. Preferably, for optimum results, the window selected is one that contains a good, coherent seismic signal. The window of seismic data selected during step 12 is then processed in the computer during step 14. One or more attributes is computed from the data and the attribute values so determined are stored in the computer.

Attributes such as amplitude, phase, central frequency, bandwidth, signal-to-noise ratio, local crosscorrelation coefficient, or others may be computed and used according to the present invention. Preferably, the attribute chosen may be one that an analyst expects should be invariant to the process. In such a case, any observed changes are thus interpreted as being caused by a processing error. For example, if the seismic data processing software under evaluation is a DMO or dip moveout step or suite, correct DMO processing preserves amplitude and phase of the seismic data. Thus, for DMO processing software quality control investigations, amplitude and phase attributes should be invariant or constant after processing by the DMO processing software.

Alternatively, an attribute can be selected of a type that it is known that the processing data should change. The analyst can then decide if the observed changes were reasonable. For example, correct shaping deconvolution in seismic data processing should increase bandwidth, and it thus should be easy to verify by selecting a bandwidth attribute for processing. Residual statics should typically increase lateral continuity in seismic data, and thus selection of a local crosscorrelation coefficient attribute should be made. If this attribute is selected, larger values should be exhibited after processing by good quality residual static processing software.

Next, during step 16, the same seismic data selected during step 12 is passed through the seismic data processing steps under quality control evaluation. The same attribute chosen during step 14 is then recomputed in the computer during step 18 based on the processed data from step 16. The attribute values determined during step 16 are also stored and saved.

Next, during step 20, the attribute plots are compared. The attribute plots of the result from steps 14 and 18 may be plotted, and may be subjected to statistical comparison and analysis. During such comparison and analysis, an investigation is made to decide if any changes in the seismic data were expected. If unwarranted changes have occurred, then the seismic data processing suite or package under evaluation is studied to determine the cause of the change or disparity.

The present invention thus computes one or more attributes, based on the window of data selected, before and after the processing step or steps under evaluation. Any changes in the attributes between the processed data should be expected and reasonable, depending upon the attributes selected. Otherwise, if there is an unexpected change or disparity, some possible erroneous feature or step has occurred in the processing software under evaluation.

With the present invention, selection of attributes for quality control evaluation purposes has additional advantages. For example, for three-dimensional data, it is not possible to view a vast amount of such data with conventional approaches. By the present invention, using attributes, this vast amount of data can be reduced to a few selected attribute maps. These attribute maps manifest many important characteristics of the data. For example, the trace-to-trace correlation attribute measures the relative signal-to-noise ratio, and thus a map of that trace-to-trace correlation attribute can be used to identify areas in the data of poor data quality.

Figure 2:
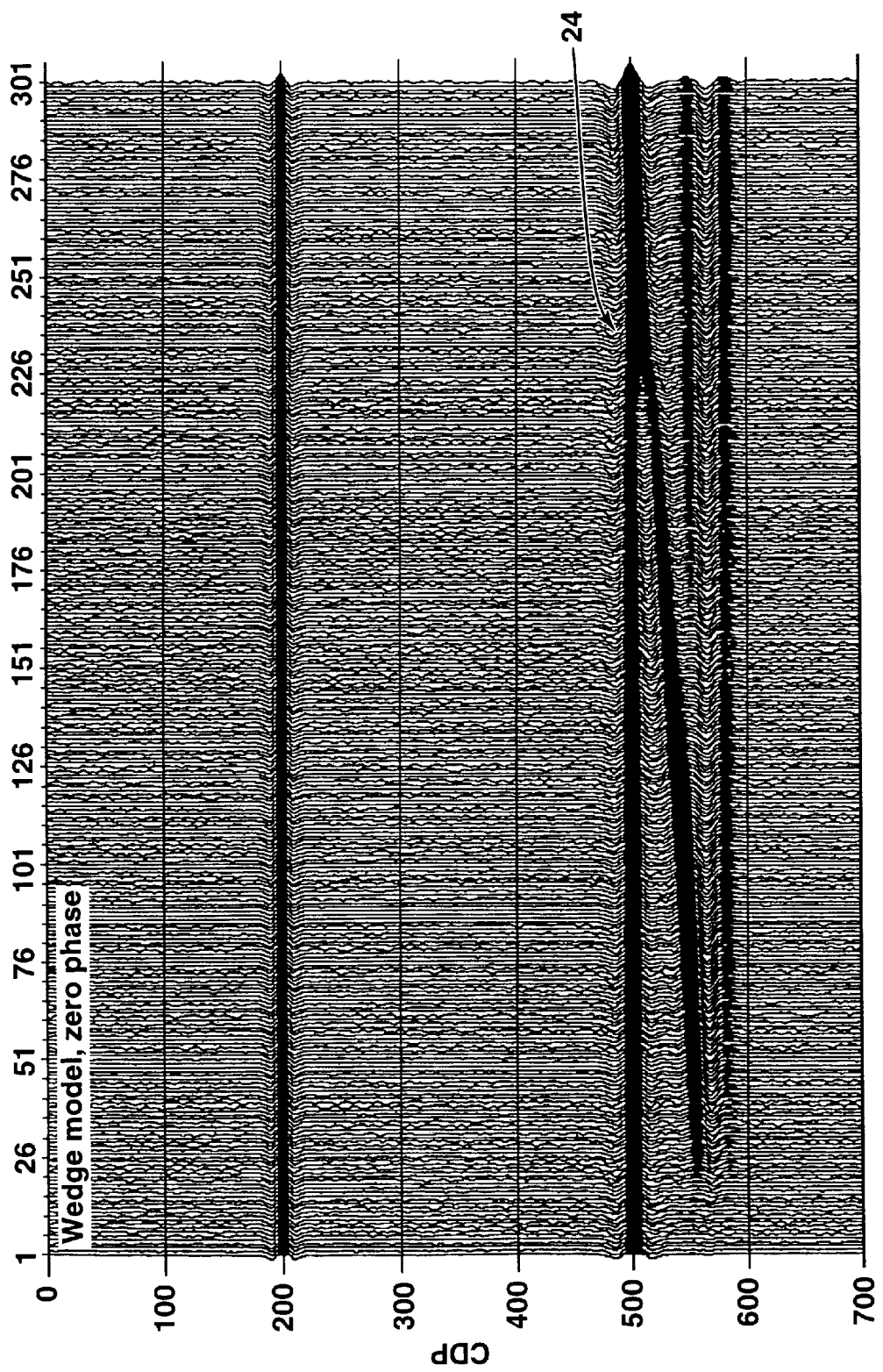
FIG. 2 is a plot of an original zero phase seismic data set.
Figure 3:
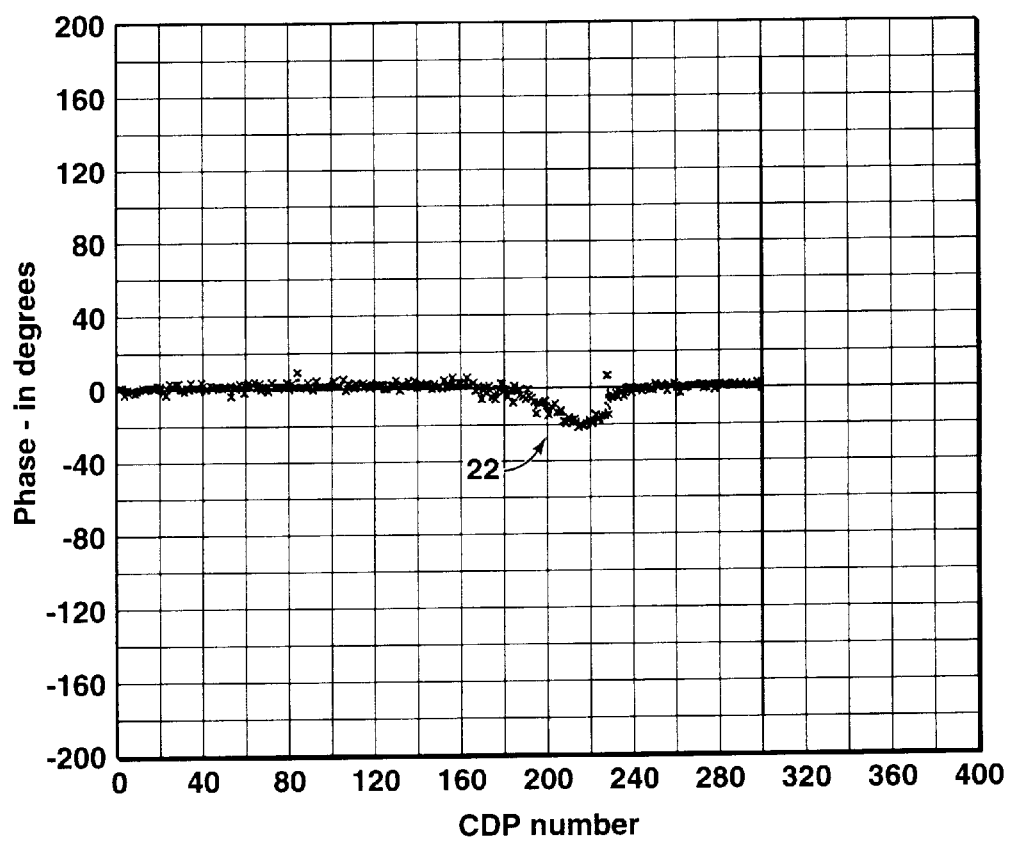
FIG. 3 is a plot of an instantaneous phase attribute obtained from the data of FIG. 2.

FIG. 2 in the drawings is plot of a section of synthetic seismic data composed of zero-phase wavelets. This data was then processed according to the present invention to demonstrate how an instantaneous phase attribute behaves after correct and incorrect deconvolution. FIG. 3 in the drawings is a plot of the instantaneous phase attribute computed on the original data set during process step 14. The response can be seen to be largely zero except in a region 22 of FIG. 3 corresponding to a region 24 of a pinchout in the original data of FIG. 2.

Figure 4:
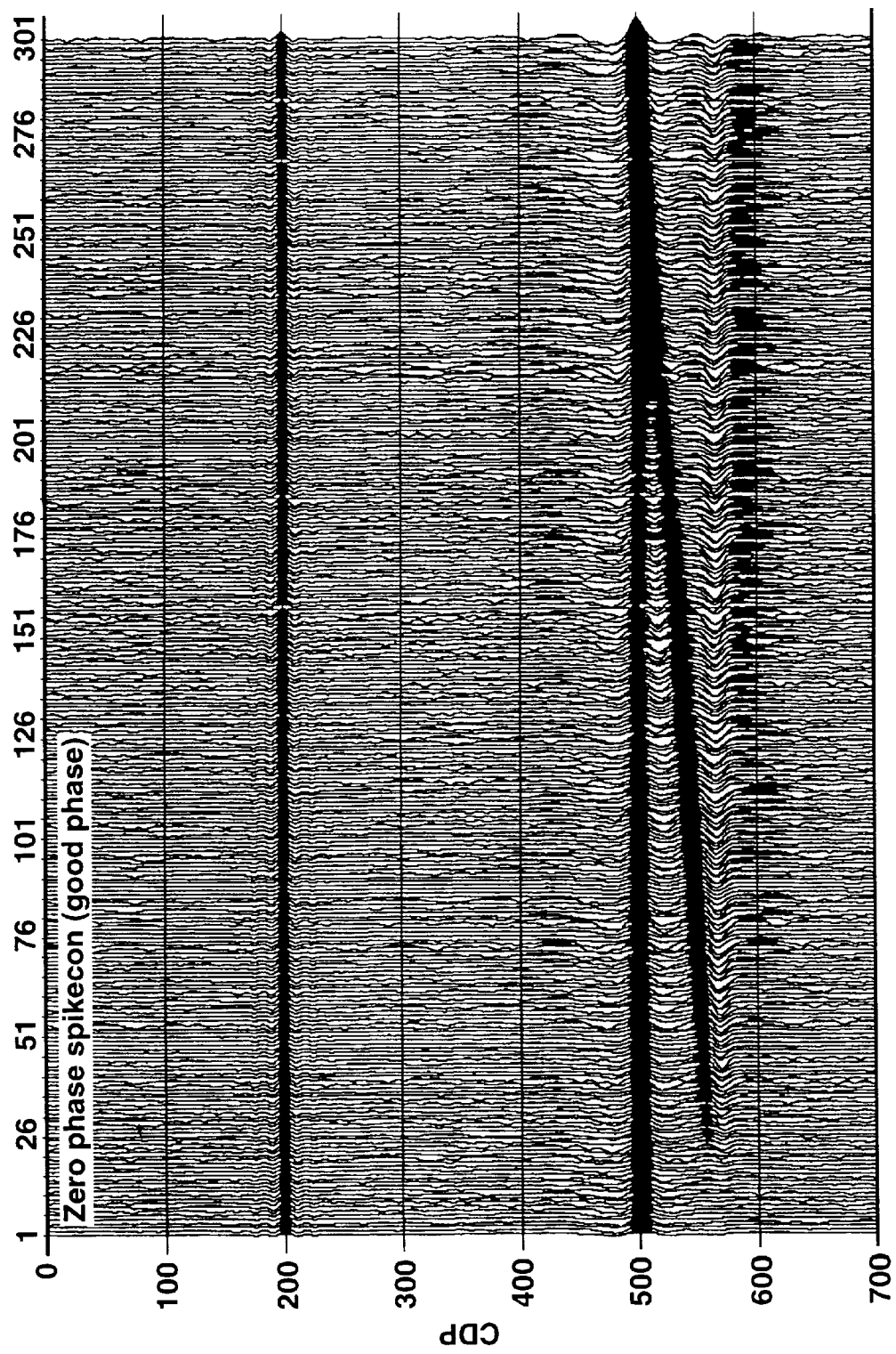
FIG. 4 is a plot of the data of FIG. 2 after zero phase deconvolution.
Figure 5:
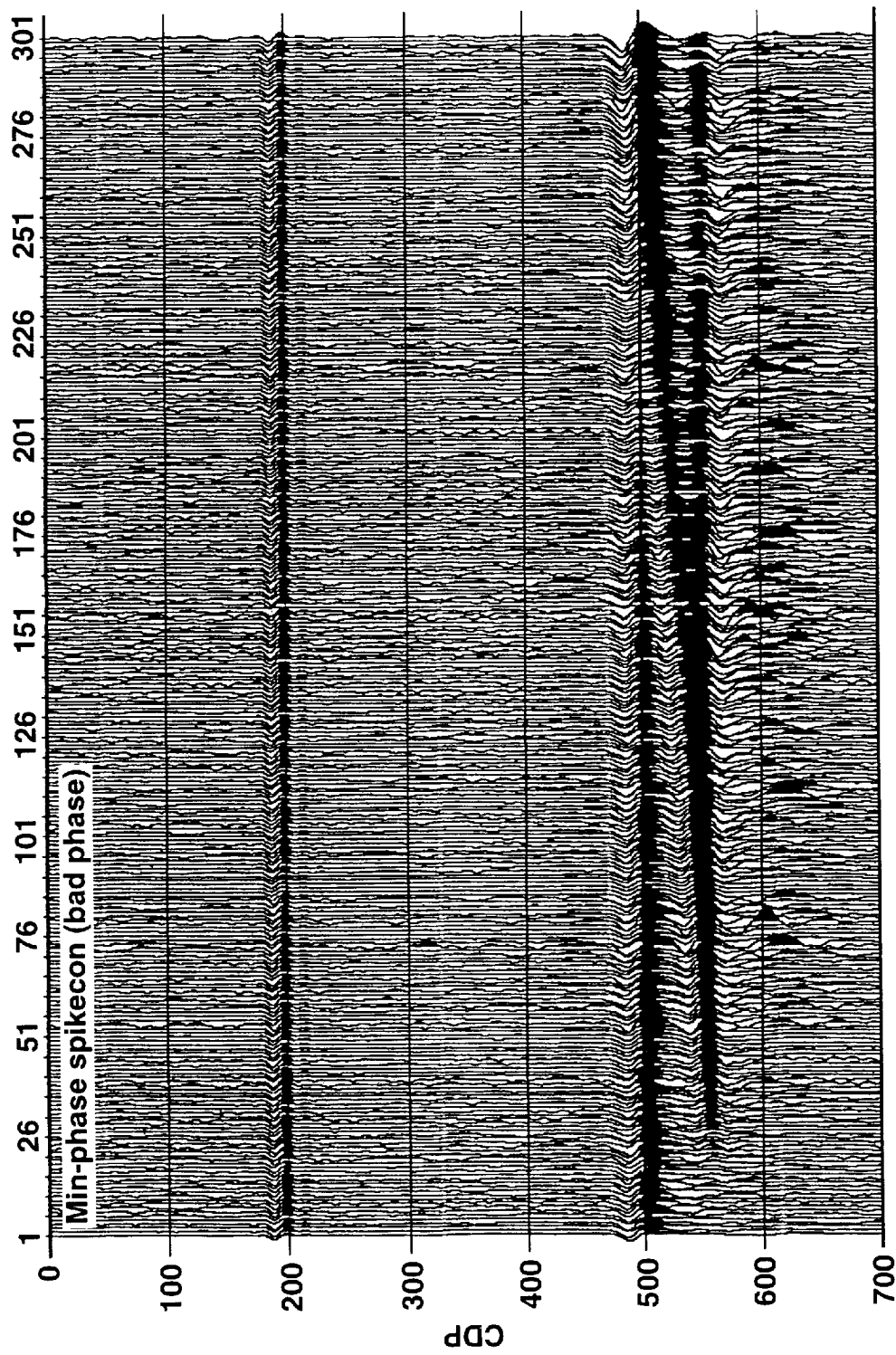
FIG. 5 is a plot of the data of FIG. 2 after minimum phase deconvolution.
Figure 6A:
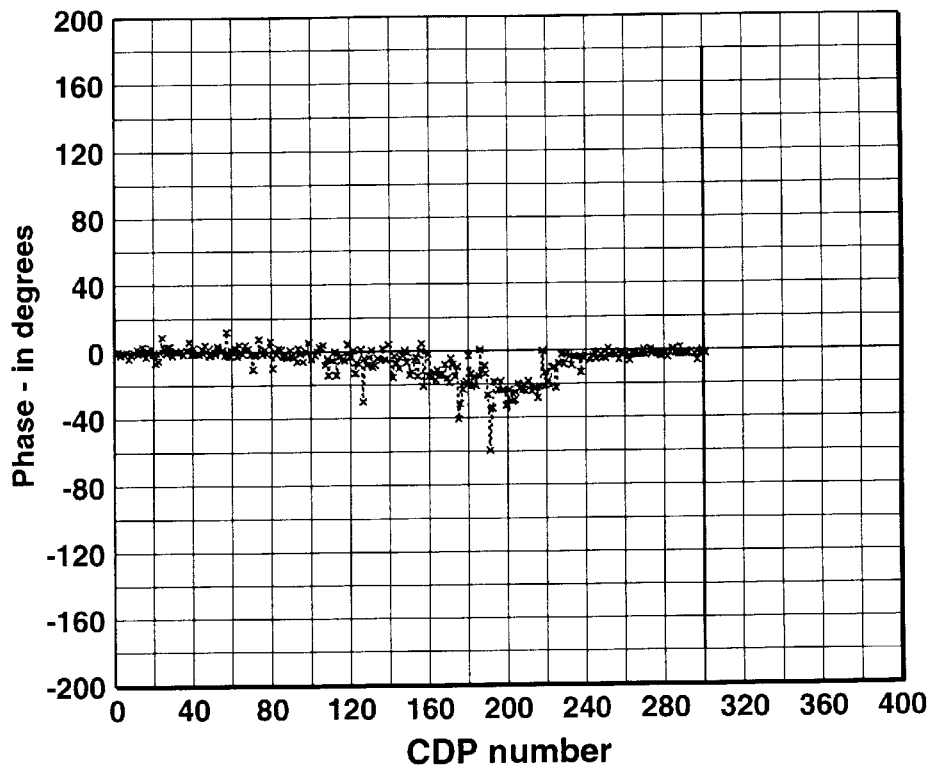
FIG. 6A is a plot of the instantaneous phase attribute of the data of FIG. 4 according to the present invention.

The same data of FIG. 2 was then processed with both zero-phase and minimum-phase deconvolution, producing the data displays of FIGS. 4 and 5, respectively. The results of the plot of the outputs of FIGS. 4 and 5 are displayed in FIGS. 6A and 6B, respectively. The data display of FIG. 6A, for zero-phase deconvolution, looks quite similar to the data of FIG. 3, except for minor jitter caused by additive, random noise. This zero-phase deconvolution processing step is acceptable because it met the original assumption of zero-phase contained in the original data of FIG. 2.

Figure 6B:
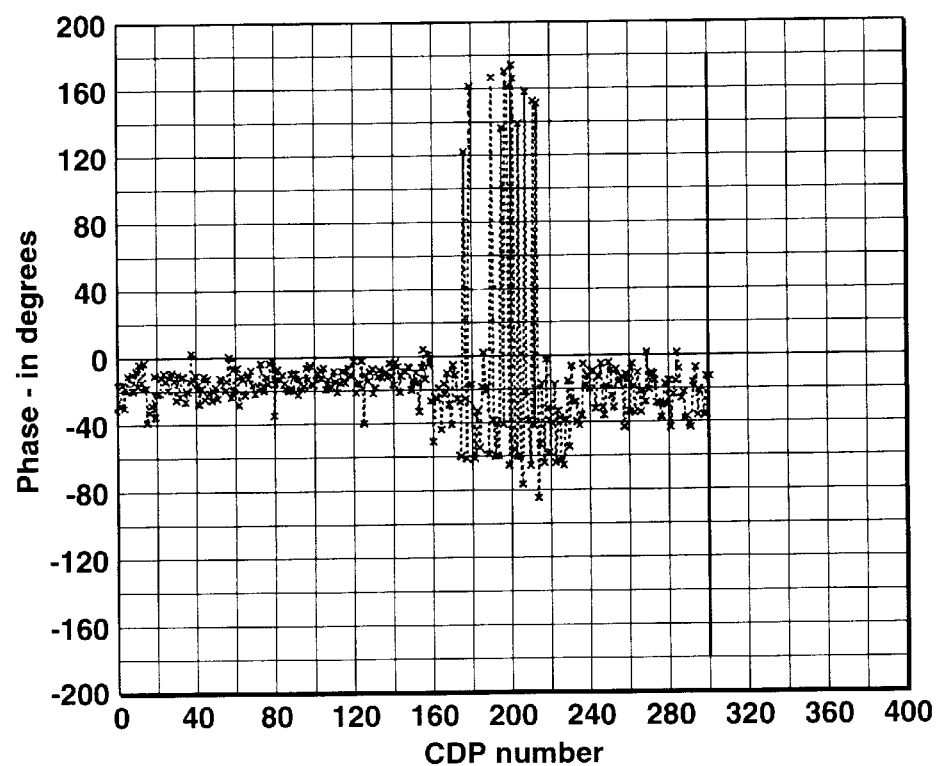
FIG. 6B is a plot of the instantaneous phase attribute of the data of FIG. 5 according to the present invention.

The data display of FIG. 6B, for minimum-phase deconvolution, however, reveals strong phase distortion. There is major jitter in the data, plus a base line phase error of $-20°$ is now present. This unexpected change of the phase attribute during the minimum-phase deconvolution signifies that something erroneous occurred during the minimum-phase deconvolution processing run which is not appropriate, since the original data is zero-phase data. Careful examination of the corresponding areas of FIGS. 2, 4, and 5 corroborates these conclusions. This demonstrates how the phase attribute may be used according to the present invention to verify how well phase assumptions of deconvolution software agree with the actual phase of the data.

2. Analysis of Statistical Attributes for Parameter Estimation

Figure 7:
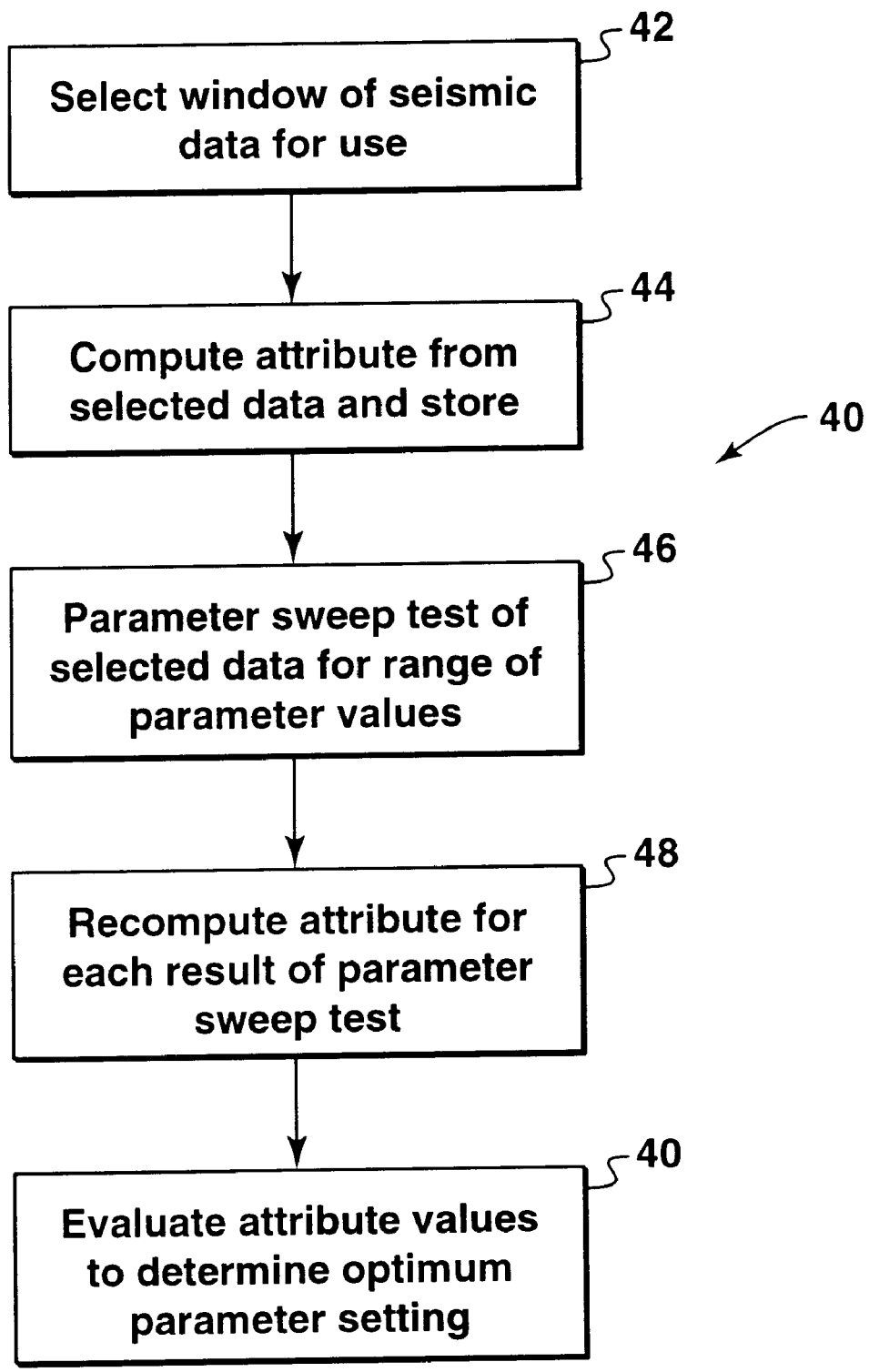
FIG. 7 is a flow chart depicting the steps of a process of selecting optimum parameter settings for seismic data processing according to the present invention.

FIG. 7 of the drawings depicts a flow chart 40 indicating the steps performed according to the present invention for analysis and evaluation of statistical attributes for selecting proper processing parameters in seismic data processing. The processing steps depicted in flow chart 40 may be performed sequentially, concurrently or independently with respect to the data processing steps of flow chart 10 discussed above. Again, certain of the processing steps of the process depicted by flow chart 40 are performed in a digital computer having the characteristics previously discussed.

During a first step 42, a window of the seismic data to be used in evaluating the appropriate values of parameters for processing seismic data is selected. Again, the window of seismic data selected for optimum results should be one that contains a good quality, coherent signal. The seismic data selected during step 42 is then processed in the computer during step 44 to compute one or more attributes from the data. The attribute values so computed are then stored and saved.

Next, during step 46, the seismic data selected during step 42 is subjected to a parameter sweep test. During the parameter sweep test, the seismic data is processed with one selected processing step for several different runs or iterations in a sweep or range of values for that parameter. Before each iteration in the sweep, one particular parameter of the processing software is adjusted. Each resultant output data set using the different values of the parameter in processing step 46 is then saved and stored.

A number of different types of processing parameters can be evaluated to determine optimal values for them according to the present invention. Examples include maximum time shift; deconvolution operator length; migration aperture width; velocity function and the like. Almost any parameter whose value is an optional, user selectable one can be quantitatively evaluated to determine an optimum value using attributes according to the present invention.

The attribute selected for use according to the present invention usually depends on the parameter being evaluated. For example, when the parameter being evaluated is maximum time shift, used for statics correction, coherency or correlation are preferable attributes. This results because a better value of time shift will produce a higher resolution in the data.

Where deconvolution operator length is the parameter, bandwidth is a helpful attribute. A proper optimal operator length (measured in time) yields a wide bandwidth with lower noise. For evaluating migration aperture width, amplitude is a useful attribute. When the aperture width is too small or too large in distance, a weak signal amplitude is exhibited. When the parameter is a velocity function, flatness or semblance is a useful attribute for evaluation purposes.

Thereafter, during step 48, the attribute selected during step 44 is then recomputed from each of the processed results obtained and stored during step 46. Again, all of the computed attribute values determined during step 48 are saved and stored. Next, during step 50, the attribute values are evaluated. The parameter that produced the optimal or best response from the attribute plots formed during step 48 is selected as the optimum value for that processing parameter. The selection may be based on statistical analysis, such as histograms or derived statistics.

A histogram is a known type of x-y plot used in statistical analysis. Histograms plot the distribution of a number of measurements. In a histogram, the vertical axis y represents the number of times that a measurement is observed to have a value x plotted on the horizontal axis. The mean of a distribution estimates the value x around which central clustering occurs. In statistical analysis, in addition to the mean of a distribution, it is typical to compute the "width" or "variability" of the measure around the mean value. This "width" or "variability" is called the variance. Higher order statistics such as kurtosis measure the peakedness or flatness of a distribution. The statistical analysis during the selection process involves calculating these values. Evaluation can take into account a number of the foregoing statistical factors including kurtosis ($\kappa$), mean ($\mu$) and standard deviation ($\sigma$).

In selecting the various values of the parameter during processing step 46, users should have some awareness or expectation of how an optimum setting for that parameter would impact or change the seismic data. FIGS. 8A, 8B and 8C show the results of a parameter sweep test for residual statics correction. The three stacked sections correspond to residual statics correction with maximum allowable time shift of 10 ms (FIG. 8A), 30 ms (FIG. 8B), and 60 ms (FIG. 8C). Visual inspection shows that the stacked section of FIG. 8A has poor statics correction compared to the stacked sections of FIGS. 8B and 8C. It is, however, difficult to discern improvement of continuity of reflections between the stacked sections of FIGS. 8B and 8C.

A statistical processing of the data depicted in FIGS. 8A, 8B and 8C was performed to measure the trace-to-trace correlation coefficients at an area 52 along the strongest reflection between 700–900 ms. The time window used to compute the correlation coefficients in this area is 100 ms long. The quantitative measurement of the trace-to-trace correlation coefficients was performed on each of the seismic sections and an analysis was made of this selected attribute.

Figure 9A:
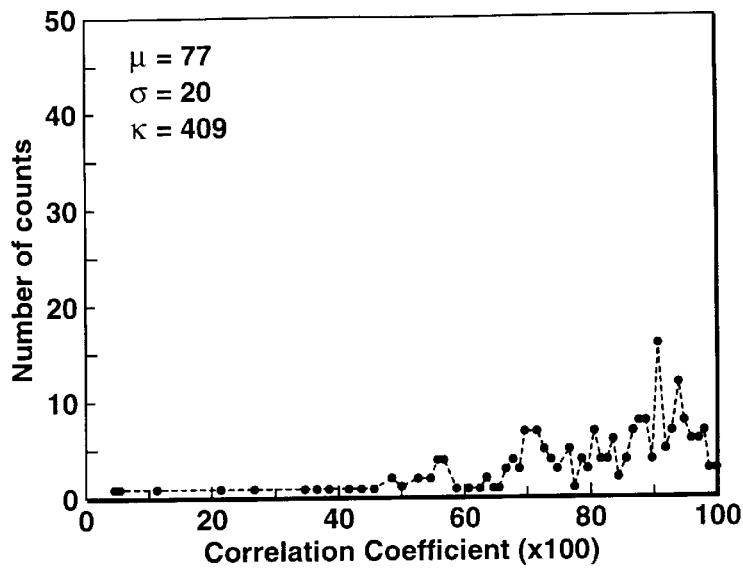
FIGS. 9A, 9B, and 9C are plots of statistical analysis according to the present invention of FIGS. 8A, 8B, and 8C, respectively.
Figure 9B:
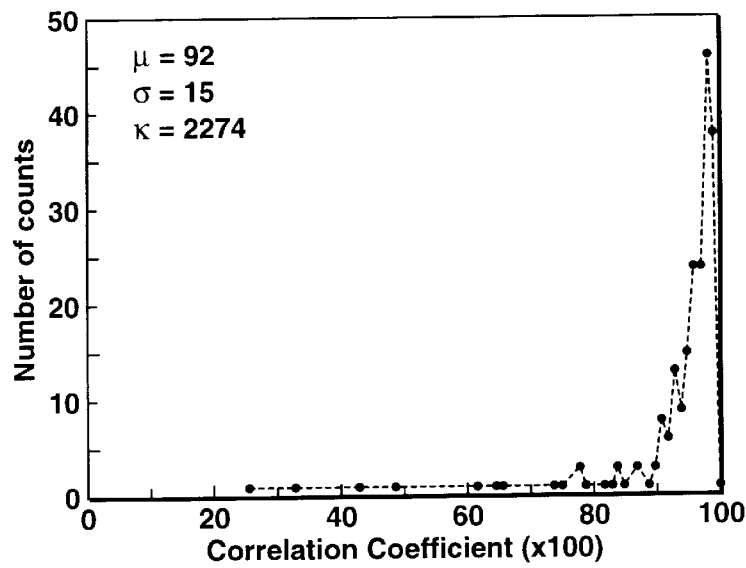
Figure 9C:
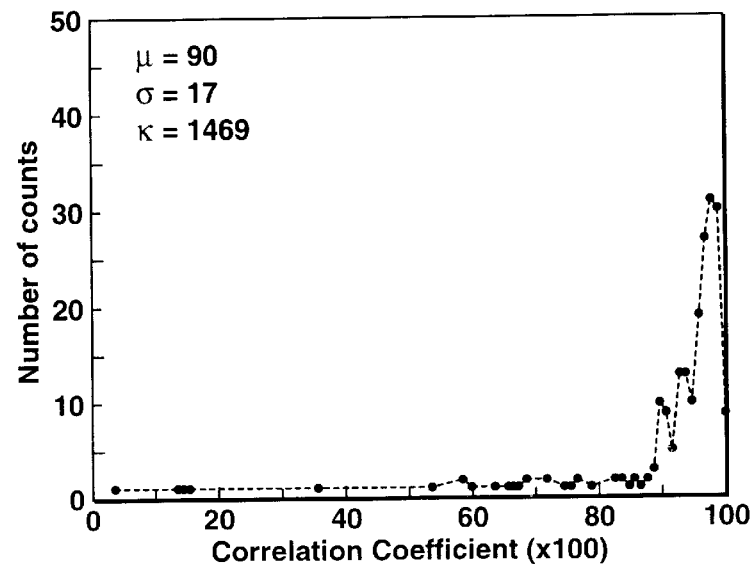

FIGS. 9A, 9B, and 9C show output plots corresponding to the three respective seismic sections. The plots in FIGS. 9A, 9B and 9C are histograms of the distribution of trace-to-trace correlation attributes in that data. The vertical axis of each of the figures is the number of traces, while the horizontal axis of the plots represents the correlation coefficients. From the histograms of FIGS. 9A, 9B and 9C it is clear that the histogram of FIG. 9B, corresponding to the stacked section of FIG. 8B is the best one. It exhibits the highest number of traces that have high correlations. This indication of high correlations indicates or implies better continuity between the data.

A detailed study of the stacked sections concurs with and supports such a conclusion. For example, an examination of the reflections at 1.3 sec. and 1.5 sec. in the data supports this conclusion. Looking at the statistical quantities of FIGS. 9A, 9B and 9C, it can be seen that the kurtosis $\kappa$ of the distribution of the correlation coefficients is more sensitive to the change of the shape of the distribution than the mean $\mu$ and the standard deviation $\rho$. The best result in the processed data is one that exhibits the highest kurtosis and mean. Kurtosis and mean prove to be excellent, quantitative indicators of how good a chosen parameter value (maximum-allowable time shift) is in improving the stack response of seismic data for static corrections. The parameter value which exhibits the best attribute response during a parameter sweep test can be seen to identify the best or optimal parameter setting for seismic data processing according to the present invention.

From the foregoing, it can be seen that the present invention permits an analyst to quantify how seismic data processing alters the attributes associated with the seismic data. Further, it enables an analyst to promptly and efficiently catch processing mistakes or software bugs in the processing software under evaluation. It further gives an analyst confidence in the quality and accuracy of the processing software.

With respect to parameter selection, the present invention allows an analyst to optimally choose processing parameters. Based on this selection of processing parameters, the available processing software that can then be used to full advantage. Further, the process of the present invention makes the evaluation of quality control of seismic data processing and of parameter estimation more quantitative through the use of statistical attributes.

The foregoing disclosure and description of the invention are illustrative and explanatory thereof, and various changes in the size, shape, and materials, as well as in the details of the illustrated method of operation may be made without departing from the spirit of the invention.

What is claimed is:

1. A method of evaluating a processing parameter value to determine the optimum setting of that parameter for processing seismic data, comprising the steps of:

forming an initial measure of a chosen seismic attribute from a selected portion seismic data of known content;

processing the selected portion of the seismic data separately for each of a set of values of the processing parameter;

storing the results of each of said separate steps of processing;

determining a value of the chosen seismic attribute for each of the stored results; and comparing the determined values of the chosen seismic attribute with the initial measure to determine the optimum value of the parameter for processing seismic data.

2. The method of claim 1, wherein the parameter is maximum time shift.

3. The method of claim 2, wherein the chosen seismic attribute is coherency.

4. The method of claim 2, wherein the chosen seismic attribute is correlation.

5. The method of claim 1, wherein the parameter is deconvolution operation length.

6. The method of claim 5, wherein the chosen seismic attribute is bandwidth.

7. The method of claim 1, wherein the parameter is migration aperture width.

8. The method of claim 7, wherein the chosen seismic attribute is amplitude.

9. The method of claim 1, wherein the parameter is seismic velocity function.

10. The method of claim 9, wherein the chosen seismic attribute is semblance.

11. The method of claim 1, further including the step of: forming displays of determined seismic attribute values.

12. The method of claim 11, wherein said step of comparing comprises comparing the displays formed of the determined seismic attribute value.

13. The method of claim 1, further including the step of: forming histograms of the determined seismic attribute values.

14. The method of claim 13, wherein said step of comparing comprises comparing the histograms formed of the determined seismic attribute values.

15. The method of claim 1, further including the step of: forming derived statistics of the determined seismic attribute values.

16. The method of claim 15, wherein said step of comparing comprises comparing the statistical attributes formed of the determined seismic attribute values.

17. A method for optimizing the value of a designated processing parameter used in designated data process operation for processing a seismic data set, comprising the steps of:

(a) selecting an attribute related to said designated processing parameter;

(b) calculating initial values of said attribute for at least a portion of said seismic data set;

(c) selecting a plurality of potential values for said designated processing parameter and, for each of said potential values,
  (i) performing said designated data processing operation on said portion of said seismic data set using said potential value for said designated processing parameter,
  (ii) recalculating values of said attribute for said processed seismic data, and
  (iii) comparing said recalculated values of said attribute to said initial values of said attribute calculated in step (b); and (d) selecting as the optimum value for said designated processing parameter the potential value which produces the best response on the value of said attribute for said processed seismic data.

18. The method of claim 17, wherein said step of comparing said recalculated values of said attribute to said initial values of said attribute is done by comparing plots of said values.

19. The method of claim 17, wherein said step of comparing said recalculated values of said attribute to said initial values of said attribute is done by comparing histograms of said values and the corresponding derives statistics.

20. A method of selecting an optimum processing parameter value for processing seismic data, comprising the steps of:

forming an initial measure of a chosen seismic attribute from a selected portion seismic data of known content;

processing the selected portion of the seismic data separately for each of a set of values of the processing parameter;

storing the results of each of said separate steps of processing;

performing a parameter sweep test of the seismic data for a set of values of the parameter;

determining a value of the chosen seismic attribute for each of the parameter values of the parameter sweep test; and analyzing the determined seismic attribute values to determine the optimum parameter values.

* * * * *